US007921416B2

(12) United States Patent
Fontoura et al.

(10) Patent No.: US 7,921,416 B2
(45) Date of Patent: Apr. 5, 2011

(54) FORMAL LANGUAGE AND TRANSLATOR FOR PARALLEL PROCESSING OF DATA

(75) Inventors: Marcus Felipe Fontoura, Los Gatos, CA (US); Vanja Josifovski, Los Gatos, CA (US); Shanmugasundaram Ravikumar, Berkeley, CA (US); Christopher Olston, Mountain View, CA (US); Benjamin Clay Reed, Morgan Hill, CA (US); Andrew Tomkins, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1157 days.

(21) Appl. No.: 11/551,336

(22) Filed: Oct. 20, 2006

(65) Prior Publication Data
US 2008/0098370 A1    Apr. 24, 2008

(51) Int. Cl.
*G06F 9/45* (2006.01)
(52) U.S. Cl. ........ 717/139; 717/103; 717/112; 717/136; 717/137; 717/142; 707/623; 707/771; 707/755
(58) Field of Classification Search .................. None
See application file for complete search history.

(56) References Cited

U.S. PATENT DOCUMENTS

| | | | |
|---|---|---|---|
| 4,656,582 A | 4/1987 | Chaitin | |
| 4,885,684 A | 12/1989 | Austin | |
| 5,590,319 A * | 12/1996 | Cohen et al. | 1/1 |
| 5,899,990 A * | 5/1999 | Maritzen et al. | 1/1 |
| 5,970,495 A * | 10/1999 | Baru et al. | 1/1 |
| 6,110,226 A | 8/2000 | Bothner | |
| 6,112,198 A * | 8/2000 | Lohman et al. | 1/1 |
| 6,145,120 A * | 11/2000 | Highland | 717/106 |
| 6,285,999 B1 * | 9/2001 | Page | 1/1 |
| 6,317,873 B1 | 11/2001 | Townsend | |
| 6,609,131 B1 | 8/2003 | Zait | |
| 6,625,593 B1 | 9/2003 | Leung | |
| 6,760,719 B1 * | 7/2004 | Hanson et al. | 1/1 |
| 6,826,753 B1 | 11/2004 | Dageville | |
| 6,836,883 B1 | 12/2004 | Abrams | |
| 6,934,709 B2 | 8/2005 | Tewksbary | |
| 7,000,227 B1 | 2/2006 | Henry | |
| 7,024,664 B2 | 4/2006 | Beckmann | |
| 7,054,852 B1 | 5/2006 | Cohen | |
| 7,065,618 B1 * | 6/2006 | Ghemawat et al. | 711/161 |

(Continued)

OTHER PUBLICATIONS

Jeffrey Dean and Sanjay Ghemawat, MapReduce: Simplified Data Processing on Large Cluster, 2004, Google Inc, pp. 1-13.*

(Continued)

*Primary Examiner* — Michael J Yigdall
*Assistant Examiner* — Ziaul Chowdhury
(74) *Attorney, Agent, or Firm* — James J. Woods; Mauriel Kapouytian & Treffert LLP

(57) ABSTRACT

The present invention, in an example embodiment, provides a special-purpose formal language and translator for the parallel processing of large databases in a distributed system. The special-purpose language has features of both a declarative programming language and a procedural programming language and supports the co-grouping of tables, each with an arbitrary alignment function, and the specification of procedural operations to be performed on the resulting co-groups. The language's translator translates a program in the language into optimized structured calls to an application programming interface for implementations of functionality related to the parallel processing of tasks over a distributed system. In an example embodiment, the application programming interface includes interfaces for MapReduce functionality, whose implementations are supplemented by the embodiment.

20 Claims, 7 Drawing Sheets

U.S. PATENT DOCUMENTS

| | | | | |
|---|---|---|---|---|
| 7,076,772 | B2 | 7/2006 | Zatloukal | |
| 7,085,769 | B1* | 8/2006 | Luo et al. | 1/1 |
| 7,089,544 | B2 | 8/2006 | Hickson | |
| 7,093,231 | B2 | 8/2006 | Nuss | |
| 7,099,871 | B2 | 8/2006 | Faybishenko | |
| 7,325,232 | B2* | 1/2008 | Liem | 718/102 |
| 7,376,661 | B2* | 5/2008 | Larson | 1/1 |
| 7,515,603 | B2 | 4/2009 | Courteille | |
| 7,555,745 | B2* | 6/2009 | Iwashita | 717/137 |
| 7,607,130 | B2* | 10/2009 | Singh et al. | 718/100 |
| 2004/0172445 | A1* | 9/2004 | Singh et al. | 709/200 |
| 2005/0182752 | A1* | 8/2005 | Rojer | 707/2 |
| 2006/0010432 | A1* | 1/2006 | Iwashita | 717/136 |
| 2006/0070086 | A1* | 3/2006 | Wang | 719/320 |
| 2006/0106585 | A1* | 5/2006 | Brown et al. | 703/1 |
| 2006/0123048 | A1* | 6/2006 | Larson | 707/103 R |

OTHER PUBLICATIONS

Doug Cutting. Scalable Computing with Hadoop, May 4, 2006, Cutting@apache.org, pp. 1-21.*

Welcome to Apache Hadoop, Apache Foundetion, 2007, Apache Foundetion pp. 1-3.*

Map/Reduce, Christopke Bisciglia, Aaron Kimball, Sierra Cichels-Slettvet,Date Unknown, pp. 1-36.*

Jeffrey Dean et al.MapReduce, Aug. 2004, Google Inc ,1-41.*

Cutting, Doug, "Scalable Computing with Hadoop," http://www.opendocs.net/apache/hadoop/yahoo-sds.pdf (downloaded Nov. 5, 2010), May 4, 2006.

Cutting, Doug, "Scaling Nutch," http://iwaw.europarchive.org/05/cutting.pdf (downloaded Nov. 5, 2010), Sep. 22, 2005.

Cutting, Doug, "Scalable Computing with MapReduce," *Open Source Convention*, Portland, OR, http://wiki.apache.org/nutch/Presentations?action=AttachFile&do=get&target=oscon05.pdf, Aug. 2005.

Dean, Jeffrey, et al., "MapReduce: Simplified Data Processing on Large Clusters," OSDI'04: Sixth Symposium on Operating System Design and Implementation, San Francisco, CA, Dec. 2004.

Ioannidis, Yannis, "Query Optimization," http://infolab.stanford.edu/~ hyunjung/cs346/ioannidis.pdf (downloaded Nov. 5, 2010), 1996.

Ghemawat, Sanjay, "The Google File System," *SOSP '03*, labs.google.com/papers/gfs-sosp2003, Oct. 2003.

"JOQRS: Parallel Query Optimization," http://infolab.stanford.edu/joker/joqrs.html downloaded on Nov. 9, 2010, Oct. 2006.

Kornfeld, William A. et al., "The Scientific Community Metaphor," *IEEE Transactions on Systems, Man, and Cybernetics*, vol. SMC-11, (1), 24-33, Jan. 1981.

"Lucene-hadoop Wiki Front Page" , Sep. 27, 2006.

Singh, Satnam, Higher Order Combinators for Join Patterns Using STM,: *Proc. TRANSACT Workshop, OOPSLA*, 2006.

"HP Unified Parallel C (UPC) Compiler" http://h21007.www 2.hp.com/portal/site/dspp/menuitem.863c3e4cbcdc3f3515b49c108973a801/?ciid=c108e1c4dde02110e1c4dde02110275d6e10RCRD.

"The Relational Model-theoretical foundation," www.cc.gatech.edu/classes/cs4450_99.../algebracalculus.ppt.

* cited by examiner

Top-Level Syntax for Formal Language

```
EVAL ...
OVER R [<alias>] [[OUTER | INNER] GROUP ...]
[, S [<alias>] [[OUTER | INNER] GROUP ...]] ...
[UNION ...]
```

Logical Operators and
Flat vs. Non-Flat (e.g., Nested) Tuples

| operator | input tuple type | output tuple type |
|---|---|---|
| Apply | Tuple | Tuple |
| Cogroup | FlatTuple | Tuple |
| Cross | FlatTuple | Tuple |
| Flatten | Tuple | FlatTuple |
| Load | -- | FlatTuple |
| Read | -- | FlatTuple |
| Store | FlatTuple | -- |
| Union | FlatTuple | FlatTuple |

(final output always gets flattened)

Fig. 4

Semantics for Formal Language (Illustrated by Example)

| Select expr | semantics |
|---|---|
| EVAL f(*) | apply function "f" to tuples that come out of From+Group expr |
| EVAL f(R.$1) | apply function "f", but projected down to just R.$1 |
| EVAL f(R.*), g(R.*) | apply functions "f" and "g", each to all columns of R |
| EVAL f(group.$1) | projected down to the first group column |
| EVAL f(group.$1, group.$2) | projected down to first and second group columns |
| EVAL f(group.*) | projected down to all group column(s) |
| EVAL f(group) | projected down to all group column(s) |
| EVAL R.$1, S.$2 | sugar for EVAL no-op(R.$1), no-op(S.$2) |
| EVAL * | sugar for EVAL group.*, R.*, S.*, ... |
| EVAL f(R.$1, S.$1) | "f" sees tuples of the form <{<t1>...}, {<ta>...}> |
| EVAL f(R.{$1,$2}) | "f" sees tuples of the form <{<a,b>...}> |

| From+Group expr | output format (i.e., what goes into Select clause) |
|---|---|
| OVER R | <R1> |
| OVER R, S | < { <R1> }, { <S1> } > |
| OVER R GROUP ... | < group, { <R1>, <R2>, ... } > |
| OVER R GROUP ..., S GROUP ... | < group, { <R1>, <R2>, ... }, { <S1>, <S2>, ...} > |
| OVER R OUTER GROUP | same as OVER R GROUP (outer is default) |
| OVER R INNER GROUP, S GROUP | groups for which R does not have any tuples are omitted |

| Group expr | semantics |
|---|---|
| GROUP ALL | all tuples in one group labeled "all" |
| GROUP ANY | arbitrary groups (decided by system) |
| GROUP BY f($1) | group according to grouping function "f" (project to $1 prior to f) |
| GROUP BY f($1, $2) | group according to grouping function "f" (project to $1,$2 prior to f) |
| GROUP BY f(*) | group according to grouping function "f" (no projection prior to f) |
| GROUP BY $1 | sugar for GROUP BY no-op($1) |
| GROUP BY ($1, $2) | sugar for GROUP BY no-op($1, $2) |

FORMAL LANGUAGE AND TRANSLATOR FOR PARALLEL PROCESSING OF DATA

TECHNICAL FIELD

The present invention relates in general to formal languages and translators, such as preprocessors and interpreters, and in particular to a formal language and a translator that, in some embodiments, might be used to effectuate the parallel processing of multiple large databases, using a distributed system, e.g., a computing network with a distributed file system.

BACKGROUND

Some computer programs, such as search engines, must process extensive amounts of data. In the course of this processing, these programs often create huge files which tend to take the form of a flat-file database, e.g., a table of entries which are separated by delimiters but which lack the structural relationships one would find in a relational or object database. Colloquially, one might refer to a flat-file database as a spreadsheet or a log file.

In order to express a computation over large databases, programmers must either develop simple, non-parallel scripts which take a long time to run or complex, parallel scripts which take a long time to implement, debug, and maintain. Consequently, there has been considerable effort to develop systems that allow programmers to create computational expressions which are relatively simple and which are processed in parallel over a distributed system, possibly comprising a high-availability cluster of commodity servers.

In this regard, the Apache Software Foundation has developed a collection of programs called Hadoop (named after a toddler's stuffed elephant), which consists of: (a) a distributed file system (see U.S. Pat. No. 7,065,618, whose disclosure is incorporated herein by reference); and (b) an application programming interface (API) and corresponding implementation of the MapReduce functionality developed by Jeffrey Dean and Sanjay Ghemawat. As to the latter functionality, see "Scalable Computing with MapReduce" by Doug Cutting (Aug. 3, 2005; OSCON). While an improvement over what went before, programmers using Hadoop must still implement, debug, and maintain relatively complex computational expressions in the form of structured calls to the interfaces in the Hadoop API and/or significantly extend Hadoop's implementation, and possibly also its API, in order to efficiently process large databases in parallel using a distributed system.

Formal languages, and their corresponding translators, enable computational expression. A formal language might comprise a programming language or a scripting language. Some programming languages are procedural or imperative, such as C and Java. These languages typically require that the programmer specify an algorithm, in terms of instructions, to be executed or run by a computing platform.

Other programming languages are declarative and allow the programmer to specify the result to be achieved, leaving the implementation for achieving the result to other supporting software. An example of a declarative programming language is Structured Query Language (SOL), which is ordinarily used to process data in a relational database. A scripting language might be a general-purpose language, such as Perl, or a special-purpose or application-specific language, such as Game Maker Language. To specify a formal language, one might create a formal grammar for that language, such as a context-free grammar.

A translator is a program that takes another program as its input. A translator might be a preprocessor (or pre-compiler) such as a C preprocessor, a compiler such as a C++ compiler or a Java JIT (Just-In-Time) compiler, or an interpreter such as a Perl interpreter. Typically, a preprocessor runs before a compiler and performs textual substitution on source-code programs. In the case of embedded SQL, the SQL preprocessor or pre-compiler substitutes procedure calls to an API for declarative SQL statements embedded in a host source-code program written in a procedural language such as C or COBOL. In Java, embedded SQL often involves the use of an API called Java Database Connectivity (JDBC), which in turn makes use of an API called Open Database Connectivity (ODBC).

The difference between a compiler and an interpreter is that a compiler is a pure translator that translates its input program into a program in another language, typically byte code or executable machine code. An interpreter ordinarily executes its input program on the interpreter's computing platform.

One might think of a translator such as an interpreter, as having a front-end parser and a back-end interpreter. Typically, the front-end parser will translate an input program into an intermediate representation, such as an abstract syntax tree, while detecting any lexical, syntactic, or semantic errors dictated by the language specification. Then the back-end interpreter will execute the intermediate representation, e.g., by walking the abstract syntax tree.

Likewise, one might think of a translator such as a compiler as having a front-end parser and a back-end code generator. Typically, the front-end parser will translate a source-code program into an intermediate representation and the back-end code generator will generate optimized code, e.g., executable machine code, from the intermediate representation.

SUMMARY OF THE INVENTION

In some embodiments, the present invention provides a formal language and a translator for that language. The formal language is a special-purpose formal language that facilitates the expression of parallel computations processing large databases over a distributed system. In particular embodiments, the formal language builds upon the commands found in the SQL language and allows the declarative co-grouping of tables, each with an arbitrary alignment function.

Also in some embodiments of the present invention, the formal language includes features which are characteristic of a procedural, rather than a declarative, language. Thus, for example, the formal language supports the specification of procedural operations to be performed on a co-grouping of tables.

In some embodiments of the present invention, the formal language's translator comprises a preprocessor or parser which translates statements in the formal language into optimized calls to an API providing interfaces to implementations of functionality for the parallel processing of tasks over a distributed system. In particular embodiments, the translator further provides supplemental implementations to existing parallel-processing functionality. In some embodiments, the parallel-processing functionality includes a distributed file system and procedures to process a job, divided into tasks, on a plurality of network nodes.

The following detailed description, together with the accompanying drawings, will provide a better understanding of the nature and advantages of the present invention.

BRIEF DESCRIPTION OF THE DRAWINGS

FIG. 4 and FIG. 5 are diagrams showing a top-level syntax, a table of logical operators, and an illustrative semantics for the formal language, which might be used with an embodiment of the present invention.

DETAILED DESCRIPTION OF EXAMPLE EMBODIMENTS

The following example embodiments are described and illustrated in conjunction with apparatuses, methods, and systems which are meant to be examples and illustrative, not limiting in scope.

A. Distributed Computing Network or Cluster

Figure 1:
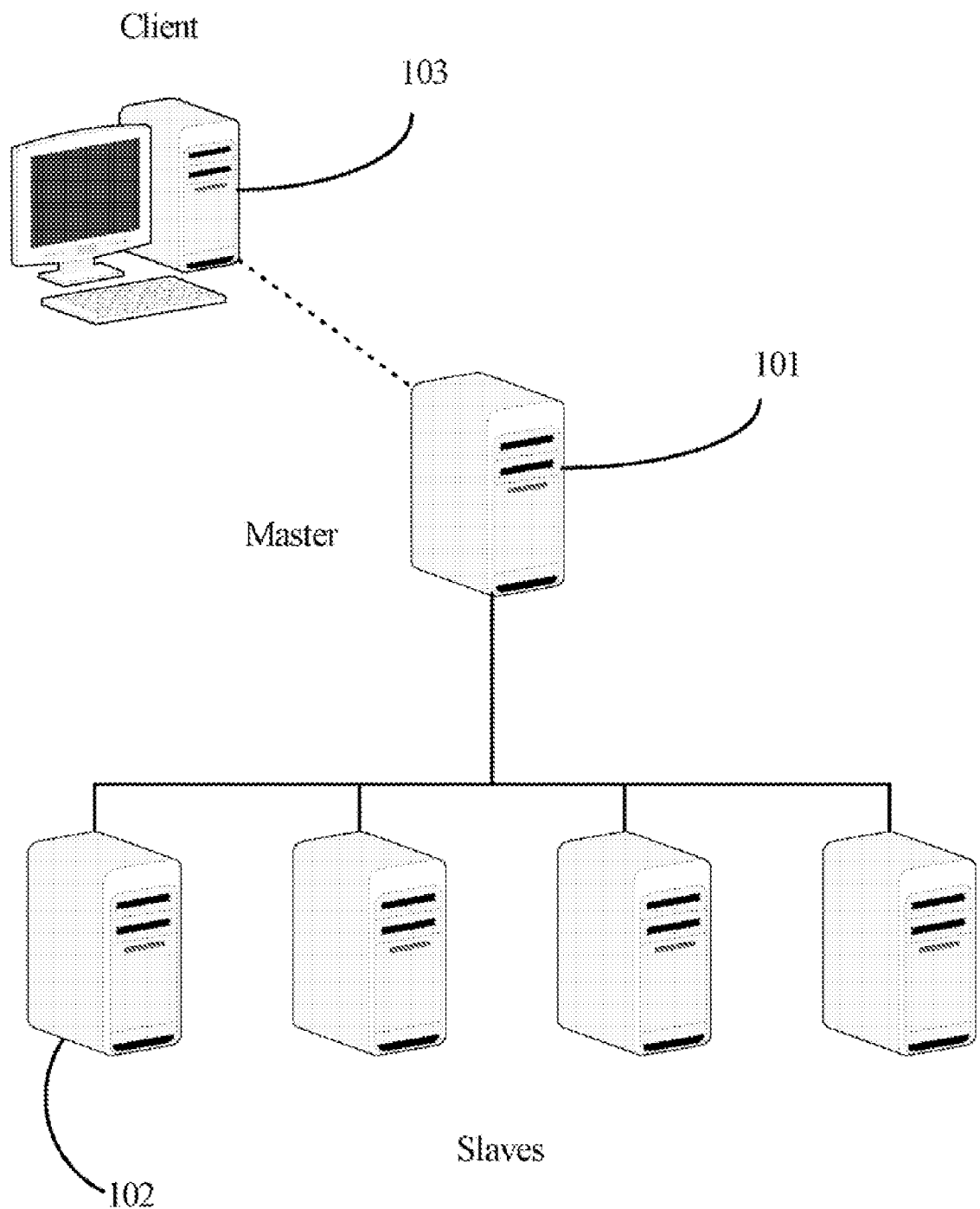
FIG. 1 is a diagram showing an example distributed computing system or cluster, which might be used with an embodiment of the present invention.

FIG. 1 illustrates an example distributed computing system, consisting of one master server 101, four slave servers 102, and a client 103. In some embodiments of the present invention, the distributed computing system comprises a high-availability cluster of commodity servers in which the slave servers are typically called nodes. Though only four nodes are shown in FIG. 1, the number of nodes might well exceed a thousand in some embodiment. Ordinarily, nodes in a high-availability cluster are redundant, so that if one node crashes while performing a particular application, the cluster software can restart the application on one or more other nodes.

Multiple nodes also facilitate the parallel processing of large databases. In some embodiments of the present invention, a master server, such as 101, receives a job from a client, such as 103, and then assigns tasks resulting from that job to slave servers or nodes, such as servers 102, which do the actual work of executing the assigned tasks upon instruction from the master and which move data between tasks. In some embodiments, the client jobs will invoke Hadoop's MapReduce functionality, as supplemented by the present invention.

Likewise, in some embodiments of the present invention, a master server, such as server 101, governs the distributed file system needed to support parallel processing of large databases. In particular, the master server manages the file system's namespace and block mapping to nodes, as well as client access to files, which are actually stored on slave servers or nodes, such as 102. In turn, in some embodiments, the slave servers do the actual work of executing read and write requests from clients, such as 103, and perform block creation, deletion, and replication upon instruction from the master server. Here again, in some embodiments, the distributed file system might be the file system provided by Hadoop. In this regard, see the documentation for Hadoop maintained by the Apache Software Foundation, including the FrontPage to the Lucene-hadoop Wiki.

Figure 2:
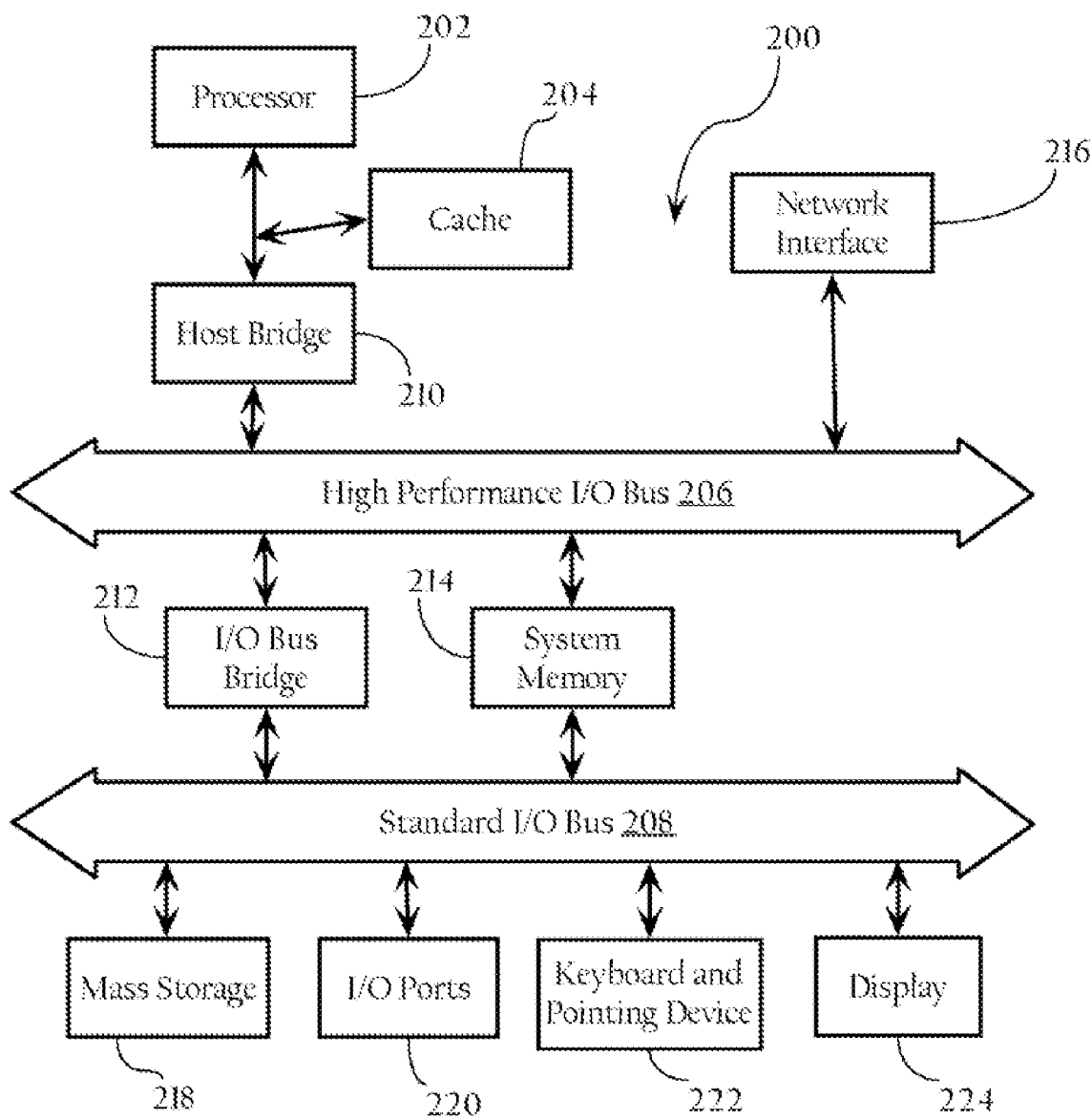
FIG. 2 is a diagram showing the system architecture for a distributed system server or node, which might be used with an embodiment of the present invention.

FIG. 2 illustrates, for didactic purposes, a hardware system 200, which may be used to implement the master server 101 or slave servers 102 in FIG. 1, or even the client 103 in FIG. 1. In one implementation, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218 and I/O ports 220 couple to bus 208. In one implementation, hardware system 200 may also include a keyboard and pointing device 222 and a display 224 coupled to bus 208. Collectively, these elements are intended to represent a broad category of computer hardware systems, including but not limited to general purpose computer systems based on the x86-compatible processors manufactures by Intel Corporation of Santa Clara, Calif., and the x86-compatible processors manufactured by Advanced Micro Devices (AMD), Inc., of Sunnyvale, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the RF coverage map generator, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures, and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments only a single bus may exist with the components of hardware system 200 being coupled to the single bus. Furthermore, hardware system 200 may include additional components, such as additional processors, storage devices, or memories.

In particular embodiments, the translating and processing functionality described herein is implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and the accessed and executed by processor 202.

An operating system manages and control the operation of hardware system 200, including the input and output of data to and from software applications (not shown). The operating system provides an interface between the software applications being executed on the system and the hardware components of the system. According to one embodiment of the present invention, the operating system in the LINUX operating system. However, the present invention may be used with other suitable operating systems, such as the Windows® 95/98/NT/XP operating system, available from Microsoft Corporation of Redmond, Wash., the Apple Macintosh Operating System, available from Apple Computer Inc. of Cupertino, Calif., UNIX operating systems, and the like.

B. Translation Process

Figure 3:
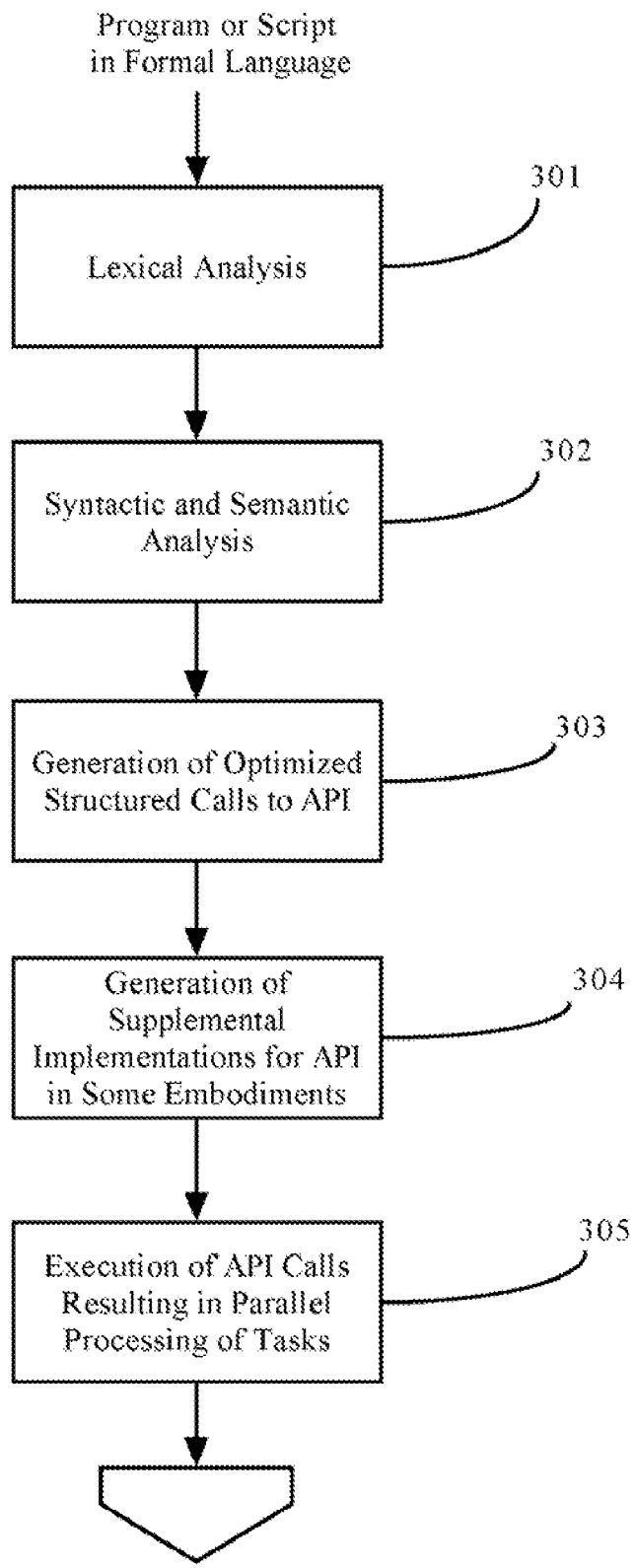
FIG. 3 is a diagram showing a flowchart of a translation process which might be used with an embodiment of the present invention.

FIG. 3 illustrates the translation process used by particular embodiments of the present invention. As shown there, the process takes as an input a program or script written in the formal language, which program or script is typically embedded in a host source-code program written in a procedural language such as Java.

The first step 301 of the process involves lexical analysis of the input program's text. In this step, an embodiment of the present invention might break that text up into a sequence of small pieces called tokens, which sequence becomes the input for the second step 302. Tokens include keywords in the formal language. Lexical analysis might also involve detection of errors such as the use of a textural character or symbol which is invalid in the formal language, for example, the "at sign" character, '@'.

The second step 302 of the translation process involves syntactic and semantic analysis of the input program. In this step, a particular embodiment of the present program might check the token sequence for compliance with the formal language's grammar, an example of which is shown in FIG. 4 and FIG. 5, and emit errors in the event of noncompliance. Also during this step, a particular embodiment might create an intermediate representation and a symbol table which associates each symbol such as an identifier, with a location, data type, and other attributes.

The third step 303 of the process involves the generation of optimized structured calls to an API for implementations of functionality for parallel processing over a distributed system. The structure in these structured calls will ordinarily flow from the intermediate representation. In some embodiments, the structure of these structured calls will be optimized, e.g., by folding multiple statements in the formal language into a single API call whenever possible. As indicated above, in some embodiments, the API might be the Hadoop API, whose "API Docs" are maintained by the Apache Software Foundation. In such embodiments, the process might fold multiple (say, k) statements in the formal language into a single Map/Reduce command, if the first k−1 statements in the formal language do not request grouping or co-grouping. Generally speaking, this type of optimization during translation is referred to as "query optimization".

The fourth step 304 of the process is the generation of supplemental implementations for the API, in particular embodiments. Some embodiments where this might be necessary are embodiments which use the interfaces in the Hadoop API and the corresponding Hadoop implementations. In these embodiments, the present invention generates custom implementations for the Map, Reduce, InputFormat, and OutputFormat interfaces. The present invention then submits the custom implementations of these interfaces to Hadoop as part of a client's job. (Here recall the above description of master and slave servers.) In particular embodiments, the custom implementations of these interfaces might extend Hadoop functionality to allow for multiple inputs, input-specific functions, null reduces during the Reduce phase without identity partitioning, correlation of records to inputs during the Reduce phase of processing, and function pipelines in the Map and Reduce phases of processing.

The fifth step 305 of the process is the actual execution of the API calls using the corresponding implementations of functionality for disturbed, parallel processing. In particular embodiments, these implementations might be the Hadoop implementations, as supplemented by the custom implementations just described.

C. Grammar and Grammatical Example

FIG. 4 shows the top-level syntax and logical operators for the formal language, which might be used in an embodiment of the present invention. The logical operators include operators for three types of user-defined functions not found in declarative languages such as SQL: (1) "load" functions that parse input files into tuples (rows or records); (2) "(co-)group" functions that determine the group affiliation of a tuple; and (3) "apply" functions that map a tuple to a relation (i.e., zero or more tuples). In some embodiments, the formal language focuses on sequential or streaming access on read-only files. In such embodiments, file creation and deletion are the only form of update and there are no indexes. Further, in particular embodiments, the formal language creates a closed algebra with full composability.

FIG. 5 shows, by example, the semantics of the language, including its syntactic sugar (i.e., additions to the language's syntax that do not affect its expressiveness but make it "sweeter" for humans to use). As noted above, the formal language includes features characteristic of both declarative and procedural languages. Thus, as shown in FIG. 5, a statement such as EVAL f(*) and GROUP BY f(*) are grammatically correct, where "EVAL" and "GROUP BY" are declarative keywords and the "f(*)" represents an arbitrary procedure.

FIG. 5 also shows another declarative keyword, "OVER", which supports the co-grouping of data from multiple databases or tables, in some embodiments. Generally speaking, a co-group is the set of all rows of all tables which share an alignment key, where an alignment key is the value returned by an arbitrary alignment function operating on a table row. Thus, co-grouping might be expressed, using the semantics illustrated in FIG. 5, with statements such as "EVAL f(*) OVER R GROUP BY g(*), S GROUP BY h(*)" where "f(*)" again is an arbitrary procedure and "g(*)" and "h(*)" are arbitrary alignment functions that return the same alignment key.

More technically speaking, co-grouping is a primitive that takes two or more input relations and assigns tuples of the relations to groups. The output is one tuple per group, where the tuple has the form: <group id, {tuples from relation 1 that are in this group}, {tuples from relation 2 that are in this group}, ... >, where < > denotes boundaries of the tuple and { } denotes a set. The advantage of this construct is that it gives a convenient and compact representation of data that belongs to each group, and allows highly flexible within-group post-processing.

As indicated above, in a typical EVAL-OVER statement in the formal language, there is arbitrary user code in only two places, which, in turn, provides opportunities for optimization of the implementation of the computations expressed in the statement. First, the per-group computation is arbitrary, but the translator, in some embodiments, may generate the groups and assign them to particular machines in any way it chooses. Second, the computation of the grouping key for each record of a table is arbitrary, but once the key has been computed, the translator may compute the groups using any technique it chooses.

In particular embodiments, the database tables upon which the formal language operates need not be the relational database tables that one sees in a standard SQL database system; they can be flat-file databases or tables. That is to say, the formal language requires no "pre-registration" of data, so that when the user specifies a particular input table, he/she can specify in one shot the file containing the data and the representation of the data. Stored schema are optional, in some embodiments.

Returning to FIG. 5, it will be appreciated that the formal language builds and improves upon the declarative SQL language. Thus, the first column of the first table is called "Select expr", the first column of the second table is called "From+Group expr", the second column of the second table is called "output format (i.e., what goes into Select clause)", and the first column of the third table is called "Group expr". Further, the entries in the latter column include various forms of "GROUP BY" expressions, SELECT, FROM, and GROUP BY are all SQL keywords, which might be used in a SQL expression such as: SELECT books.title FROM books GROUP BY books.author. Indeed, one might regard declarative co-grouping as a generalization of SQL functionality, e.g., the GROUP BY command and join operations, wherein the predicate relating groups drawn from different tables is implicit and always equality.

Further in this regard, it will be appreciated that SQL has constructs for: (1) scanning and grouping of data; and (2) custom logic to be applied to (groups of tuples). In contrast, the formal language only has constructs for declarative scanning and (co-)grouping, and defers to user-defined functions for custom logic. This separation makes the formal language very simple, enabling the programmer to more easily make the connection between the query statements he/she writes and the underlying method of evaluation. In particular, each "OVER" statement translates to one pass over the designated relation or relations. Such statements allow for group-wise processing, with no state carried across group boundaries.

In fact, many programmers do not like SQL because it forces them to do acrobatics with their program logic, just to get it into declarative form. That is to say, they prefer writing in a procedural language, which is specifically enabled by the language constructs in the formal language. Additionally, it is in general difficult to convert complex SQL statements into efficient parallel programs. This process is called parallel query optimization and tends to work better on paper than in practice. See U.S. Pat. No. 6,112,198. By contrast, the formal language does not have any declarative constructs that cannot be evaluated efficiently in parallel.

Specifically, the declarative scanning and (co-)grouping of large relations can be done in parallel using the formal language. And, as noted above, all computations carried out on individual tuples or small groups of tuples are handled via user-defined functions. Since groups tend to be small, it is typically not important that these computations be transparent or parallelizable. That is to say, the formal language's support for procedural computation within a group or co-group allows for single-node execution, assuming that the groups or co-groups are small.

Indeed, in some embodiments, a program in the formal language may be implemented efficiently in parallel using only a sort operator per table and then a global scan of all the tables. Thus, the program's computation may be performed without either random access to the data, or an unbounded number of passes.

A hypothetical example will illustrate the formal language's grammar and features, which might be used with a particular embodiment. The hypothetical example involves data which might be generated by a search engine and assumes two separate databases named QueryResults and Pages, where QueryResults has a table with columns labeled Query, Position, and URL, and Pages has a table with columns labeled URL and PageRank (see U.S. Pat. No. 6,285,999), as shown below. Note that a query can appear more than once in the column labeled Query, if it returns multiple URLs and that PageRank is an absolute ranking independent of any query.

| QueryResults | | |
|---|---|---|
| Query | Position | URL |
| "news" | 1 | www.cnn.com |
| "news" | 2 | www.bbc.com |
| "news" | 3 | www.abc.com |
| "news" | 4 | www.cbs.com |
| "news" | 5 | www.nbc.com |
| "news" | 6 | www.wsj.com |
| * * * | * * * | * * * |
| "foo" | 1 | www.foo.com |

| Pages | |
|---|---|
| URL | PageRank |
| www.wsj.com | 0.8 |
| www.bbc.com | 0.7 |
| www.abc.com | 0.6 |
| www.cbs.com | 0.5 |
| * * * | * * * |
| www.cnn.com | 0.5 |
| www.nbc.com | 0.4 |
| www.foo.com | 0.3 |

The problem to be solved is to find each query whose results included a web page which: (a) was not among the top five positions in the results returned for the query; but (b) had the highest absolute PageRank in those results.

Following is an example program for solving this problem written in SQL, where the SQL keywords are in all capital letters. The example SQL program assumes that QueryResults and Pages are relational databases, which require a substantial effort to create, update, and maintain using a relational database management system (RDBMS). The example SQL program is purely declarative, though it might be embedded in a surrounding procedural program in a host language such as C.

```
SELECT DISTINCT query
FROM Queries
EXCEPT
SELECT query
FROM QueryResults R, Pages P
WHERE R.position <= 5 AND R.URL=P.URL AND
    P.pagerank = (SELECT MAX(pagerank)
        FROM QueryResults R2, Pages P2
```

```
WHERE R2.url = P2.url AND
    R2.query = R.query)
```

Below is an example program for solving the problem, written in the formal language which might be used in particular embodiments. Here again, the language keywords are in all capital letters. The program below will work on flat-file databases; it does not require relational databases, though some embodiments of the formal language might operate on such databases. The example program combines features of both declarative languages and procedural languages. Thus, the first EVAL statement assigns its resulting tuple to the variable T through the use of an assignment operation '='. And the second EVAL statement makes use of an algorithm set out in the procedure identified as "checkTop5(Tuple t)". The example program also illustrates co-grouping in the first EVAL statement, which includes an OVER clause that declaratively co-groups the QueryResults table and the Pages table on the basis of "url".

```
T = EVAL query, position, pagerank
    OVER QueryResults R GROUP BY url, Pages P GROUP BY url
EVAL checkTop5(*) OVER T GROUP BY query
checkTop5(Tuple t) {
  top5MaxPR = maxPR = 0
  for r in t.2;
    maxPR = max(r.pagerank, maxPR)
    if (r.position <= 5; top5MaxPR = max(r.pagerank, top5MaxPR)
  if (top5MaxPR < maxPR); emit <t.1>
}
```

D. Processing Distributed Tasks in Parallel

In particular embodiments, the present invention might run on client 103 in FIG. 1. Also in some embodiments, the present invention might translate the statements in a formal-language program into a job consisting of both structured calls to the Hadoop API and custom implementations of the API and transmit the job to the master server 101 in FIG. 1 for assignment of tasks to slave servers, such as 102, which actually execute the tasks.

Figure 6:
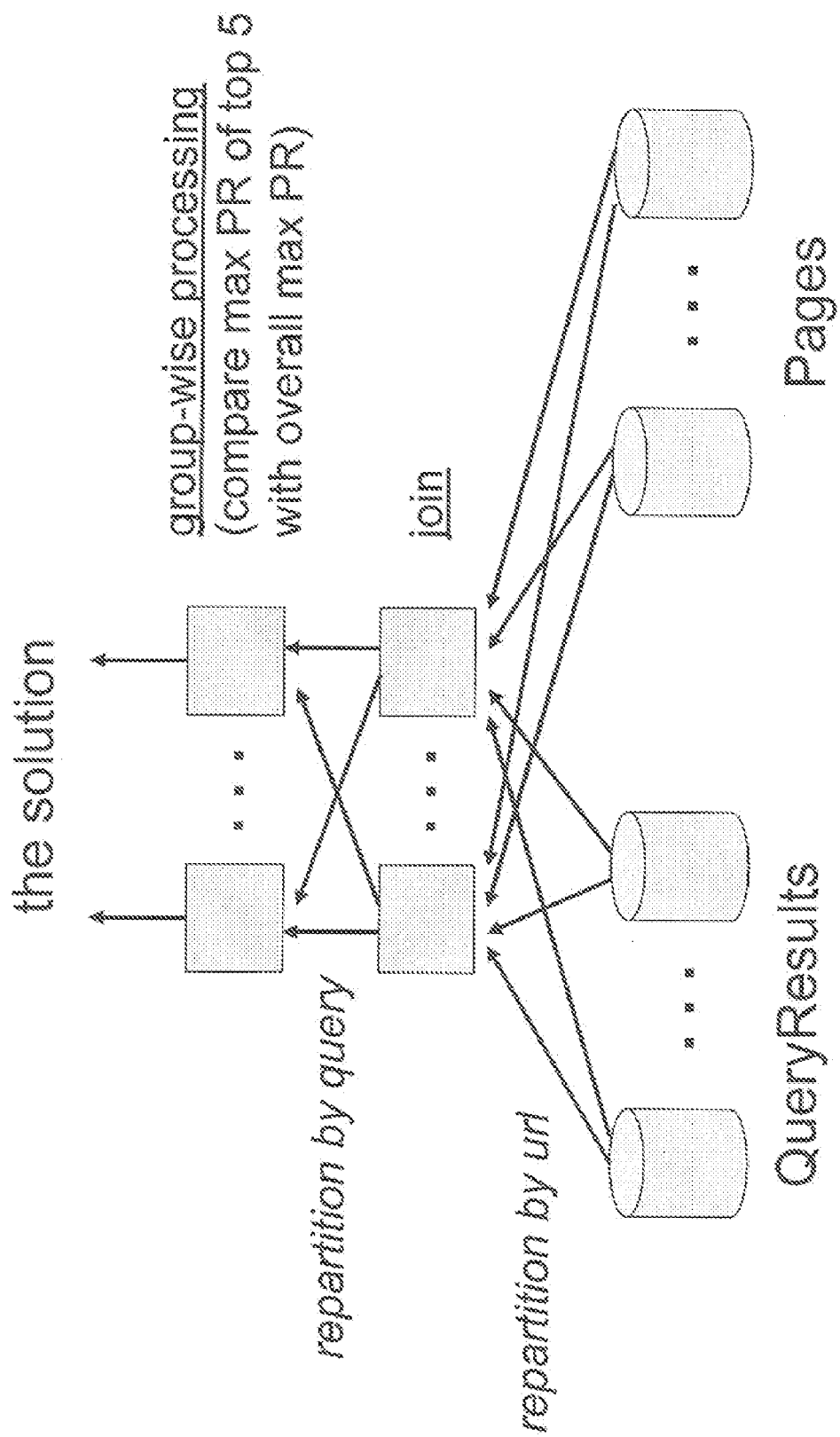
FIG. 6 is a diagram showing how one embodiment of the present invention might execute, in parallel, the tasks related to an example program.

FIG. 6 shows how a particular embodiment of the present invention might execute, in parallel, the tasks related to the example formal-language program just described. As shown at the bottom of FIG. 6, the first step in the execution process is to jointly partition the data in the QueryResults and Pages tables on the basis of "url", which, as just noted is a column in both tables. It will be appreciated that this partitioning places all of the data for a particular URL, from both the QueryResults and Pages databases, on a single logical node where the data can be joined.

Then, as shown in the middle of the diagram, the data for a particular URL is repartitioned again on the basis of query, which was a column in only the QueryResults table. It will be appreciated that this repartitioning places on a single logical node all the data needed to run the procedure check Top5 in the example program on a particular query. At this point in the process, each logical node can execute that procedure in parallel and determine a solution to the problem, which, in this problem, would include the query "news". (Note that www.wsj.com did not appear in the top five positions for the query despite having the highest absolute PageRank).

The example formal-language program simply expresses which relations are to be scanned, and how they are to be co-grouped. The details of what processing to apply to each group occurs inside the user-specified procedure, check Top5( ). This formal-language program can be evaluated by performing two passes over the data: first jointly partition the two relations on "url", and then repartition the result on "query".

The example SQL program requires more passes over the data, if evaluate directly as expressed. In principle, a cleverly-written query optimizer might restructure the computation to be closer to the form given in the example formal-language program, but query optimization often fails to produce an efficient rewriting in practice.

Figure 7:
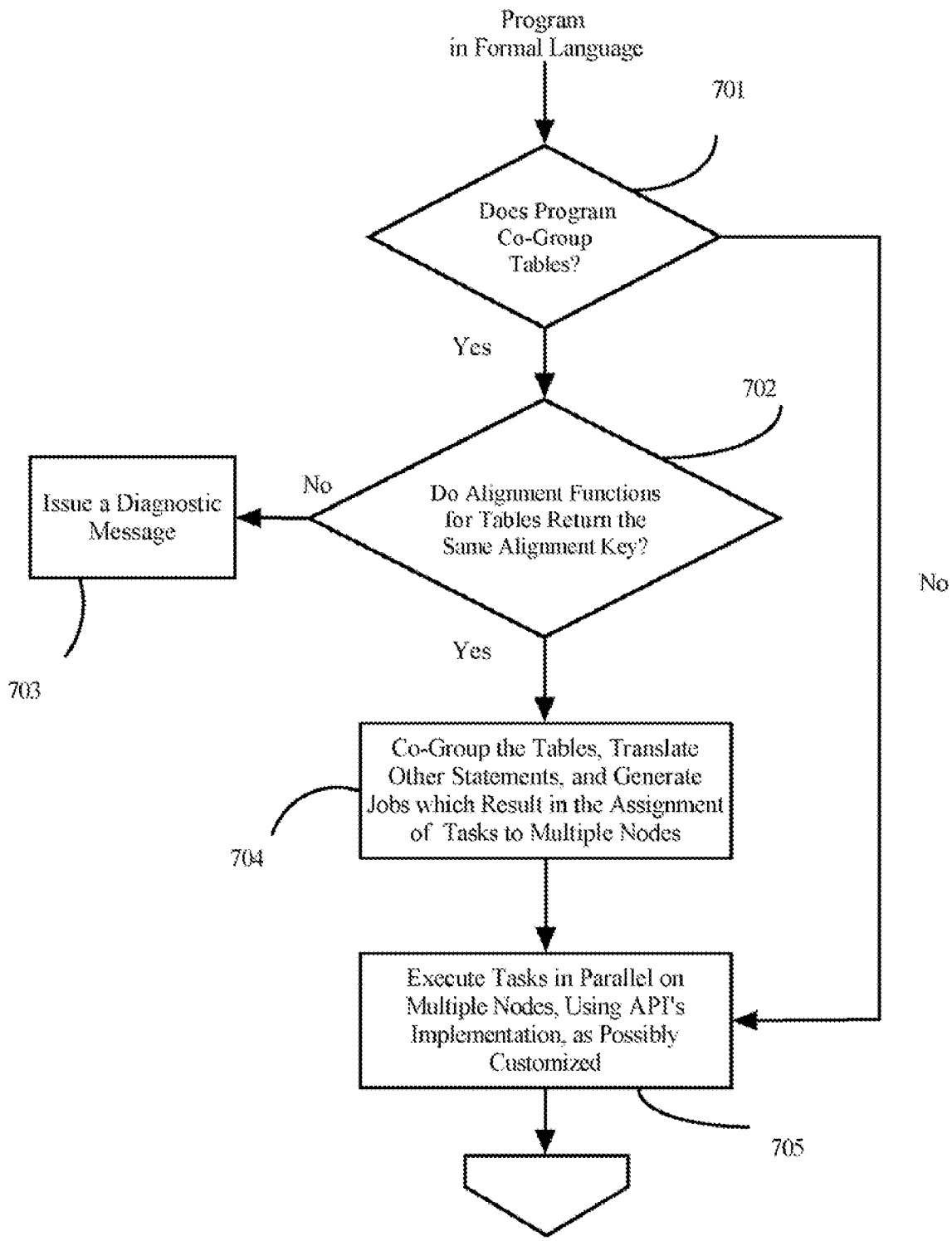
FIG. 7 is a diagram showing a flowchart for the parallel execution process that might be used with some embodiments of the present invention.

FIG. 7 shows a more generalized version of a process for parallel execution, which might be used in particular embodiments. In the first step 701, the process determines whether the program in the formed language co-groups tables. If not, the process proceeds to step 705. Otherwise, the process proceeds to step 702 and determines whether the alignment functions for the tables to be co-grouped return the same alignment key. If not, the process issues a diagnostic message at step 703. Otherwise, the process proceeds to step 704, where it co-groups the tables, translates the other statements in the program, and generates jobs which result in the assignment of tasks to multiple nodes in a distributed system, before proceeding to step 705. At step 705, the process executes the tasks in parallel on the multiple nodes, using an API's implementation, as possibly customized.

In some embodiments of the present invention, the formal language's support for co-grouping facilitates parallel processing using hashing methods. See generally, U.S. Pat. No. 7,085,769.

As discussed above, the invention's functionality in some embodiments might be comprised of instructions that are stored on storage media. The instructions might be retrieved and executed by a processing system. The instructions are operational when executed by the processing system to direct the processing system to operate in accord with the present invention.

Some examples of instructions are software, program code, firmware, and microcode. Some examples of storage media are memory devices, tape, disks, integrated circuits, and servers. The term "processing system" refers to a single processing device or a group of inter-operational processing devices. Some examples of processing devices are integrated circuits and logic circuitry. Those skilled in the art are familiar with instructions, storage media, and processing systems.

Those skilled in the art will appreciate variations of the above-described embodiment that fall within the scope of the invention. In this regard, it will be appreciated that the formal language and its translator might be used with all types of databases, not just flat-file databases, and all types of distributed systems with all types of communication protocols, not just the master-servant communication protocol. Further, it will be appreciated that the translator for the formal language might be any type of translator (e.g., a preprocessor, a precompiler, a compiler, an interpreter, etc.) with any type of front-end parser and any type of back-end. As a result, the invention is not limited to the specific examples and illustrations discussed above, but only by the following claims and their equivalents.

What is claimed is:
1. A method, comprising:
   accepting as input a program written in a formal language, wherein the input program comprises a plurality of operators that enable a declarative co-grouping of one or more tables, each with an alignment function, and a specification of zero or more procedural operations to be performed on each resulting co-group;
co-grouping one or more tables referenced in the program into one or more co-groups according to one or more operators of the formal language used in the program;
determining zero or more user-specified operations to be performed on each co-group according to the one or more operators of the formal language used in the program; and
a translator corresponding to the formal language program translating the program into one or more jobs according to the one or more operators of the formal language used in the program and based on the one or more co-groups and the zero or more operations to be performed on each co-group, wherein each job comprises one or more structured calls to an application programming interface for encoded logic that is operable to generate a plurality of tasks for the parallel processing of the job on one or more data processing devices in a distributed system.

2. The method of claim 1, further comprising the steps of: assigning the plurality of tasks to the one or more data processing devices; and
processing two or more of the plurality of tasks in parallel.

3. The method of claim 1, wherein the formal language comprises language constructs that are both declarative and procedural.

4. The method of claim 1, wherein the distributed system utilizes a master-servant communication protocol.

5. The method of claim 1, wherein the tables are flat-file databases.

6. The method of claim 1, wherein the application programming interface comprises Map and Reduce interfaces.

7. The method of claim 1, wherein the number of structured calls is minimized through query optimization.

8. One or more computer-readable non-transitory storage media Embodying software operable when executed by one or more computer systems to:
accept as input a program written in a formal language, wherein the input program comprises a plurality of operators that enable a declarative co-grouping of one or more tables, each with an alignment function, and a specification of zero or more procedural operations to be performed on each resulting co-group;
co-group one or more tables referenced in the program into one or more co-groups according to one or more operators of the formal language used in the program;
determine zero or more user-specified operations to be performed on each co-group according to the one or more operators of the formal language used in the program; and
translate the program into one or more jobs according to the one or more operators of the formal language used in the program and based on the one or more co-groups and the zero or more operations to be performed on each co-group, wherein each job comprises one or more structured calls to an application programming interface for encoded logic that is operable to generate a plurality of tasks for the parallel processing of the job on one or more data processing devices in a distributed system.

9. The media of claim 8, wherein the software when executed by one or more computer systems is further operable to: assign the tasks to data processing devices in a distributed system; and process the tasks in parallel.

10. The media of claim 8, wherein the formal language comprises language constructs that are both declarative and procedural.

11. The media of claim 8, wherein the distributed system utilizes a master-servant communication protocol.

12. The media of claim 8, wherein the tables are flat-file databases.

13. The media of claim 8, wherein the application programming interface comprises Map and Reduce interfaces.

14. The media of claim 8, wherein the number of structured calls is minimized through query optimization.

15. An apparatus comprising:
a processor and a non-transitory memory storing executable instructions which when executed perform plurality of steps comprising:
accepting as input a program written in a formal language, wherein the input program comprises a plurality of operators that enable a declarative co-grouping of one or more tables, each with an alignment function, and a specification of zero or more procedural operations to be performed on each resulting co-group; and
co-grouping one or more tables referenced in the program into one or more co-groups according to one or more operators of the formal language used in the program;
determining zero or more user-specified operations to be performed on each co-group according to the one or more operators of the formal language used in the program;
translating the program into one or more jobs according to the one or more operators of the formal language used in the program and based on the one or more co-groups and the zero or more operations to be performed on each co-group, wherein each job comprises one or more structured calls to an application programming interface for encoded logic that is operable to generate a plurality of tasks for the parallel processing of the job on one or more data processing devices in a distributed system;
assigning the tasks to data-processing devices in a distributed system; and
processing the tasks in parallel.

16. The apparatus of claim 15, wherein the formal language comprises language constructs that are both declarative and procedural.

17. The apparatus of claim 15, wherein the distributed system utilizes a master-servant communication protocol.

18. The apparatus of claim 15, wherein the tables are flat-file databases.

19. The apparatus of claim 15, wherein the application programming interface comprises Map and Reduce interfaces.

20. The apparatus of claim 15, wherein the number of structured calls is minimized through query optimization.

* * * * *